United States Patent
Shaposhnikov et al.

(10) Patent No.: US 9,331,806 B2
(45) Date of Patent: May 3, 2016

(54) SYSTEM AND METHOD FOR SEARCHING FOR ZADOFF-CHU SEQUENCES DURING A PHYSICAL RANDOM ACCESS CHANNEL SEARCH

(71) Applicants: Ron Shaposhnikov, Kiriat Shmona (IL); Michael Fatiev, Netanya (IL); Valentin Fatiev, Kiriat Shmona (IL)

(72) Inventors: Ron Shaposhnikov, Kiriat Shmona (IL); Michael Fatiev, Netanya (IL); Valentin Fatiev, Kiriat Shmona (IL)

(73) Assignee: FRISKYDSP TECHNOLOGY LTD., Netanya (IL)

( * ) Notice: Subject to any disclaimer, the term of this patent is extended or adjusted under 35 U.S.C. 154(b) by 100 days.

(21) Appl. No.: 13/904,090

(22) Filed: May 29, 2013

(65) Prior Publication Data

US 2014/0355725 A1    Dec. 4, 2014

(51) Int. Cl.
*H03D 1/00* (2006.01)
*H04L 27/08* (2006.01)
*H04J 13/00* (2011.01)

(52) U.S. Cl.
CPC .................................. *H04J 13/0062* (2013.01)

(58) Field of Classification Search
CPC ............ H04L 27/2613; H04L 27/2621; H04L 5/0048; H04L 5/0023; H04B 7/068; H04B 7/0413

USPC ........... 375/342, 343, 228; 455/440; 370/208, 370/329

See application file for complete search history.

(56) References Cited

U.S. PATENT DOCUMENTS

| | | | |
|---|---|---|---|
| 2009/0073944 A1* | 3/2009 | Jiang et al. ................... | 370/338 |
| 2010/0182898 A1* | 7/2010 | Li ......................... | H04J 11/005 370/208 |
| 2011/0122938 A1* | 5/2011 | Kameya ................ | H04L 27/263 375/228 |
| 2013/0157667 A1* | 6/2013 | Nakamura et al. ............ | 455/440 |
| 2013/0223241 A1* | 8/2013 | Zhang ..................... | H04L 27/26 370/252 |

* cited by examiner

*Primary Examiner* — Sam K Ahn
*Assistant Examiner* — Fabricio R Murillo Garcia
(74) *Attorney, Agent, or Firm* — Reches Patents

(57) ABSTRACT

A system that includes an interface, a processor; and a hardware accelerator. The hardware accelerator is arranged to perform, for each Zadoff-Chu sequence of at least a first sub-set of the set of Zadoff-Chu sequences, a first hardware accelerator set of operations that includes frequency to time domain conversion to provide third intermediate vector that is associated with the Zadoff-Chu sequence. The processor is arranged to complete the Zadoff-Chu sequence search in response to the third intermediate vector—whereas the hardware accelerator and the processor are arranged to partially search the same Zadoff-Chu sequence at different periods of time.

15 Claims, 15 Drawing Sheets

SYSTEM AND METHOD FOR SEARCHING FOR ZADOFF-CHU SEQUENCES DURING A PHYSICAL RANDOM ACCESS CHANNEL SEARCH

FIELD OF THE INVENTION

The present invention relates to speeding up the search for Zadoff-Chu sequences during a physical random access channel search.

BACKGROUND OF THE INVENTION

A Zadoff-Chu (ZC) sequence is a complex-valued mathematical sequence which, when applied to radio signals, gives rise to an electromagnetic signal of constant amplitude, whereby cyclically shifted versions of the sequence imposed on a signal result in zero cross-correlation with one another at the receiver. A generated Zadoff-Chu sequence that has not been shifted is known as a "root sequence" (www.wikipedia.org).

These ZC sequences exhibits the useful property that cyclically shifted versions of itself are orthogonal to one another, provided, that is, that each cyclic shift, when viewed within the time domain of the signal, is greater than the combined propagation delay and multi-path delay-spread of that signal between the transmitter and receiver The Physical Random Access Chanel (PRACH) is a process that facilitates the establishment of a link between mobile phones and a cell. A mobile phone that wishes to communicate with a cell selects a Zadoff-Chu sequence out of predetermined Zadoff-Chu sequences and transmits it to the cell, during a PRACH time window. If the cell does not detect, during the PRACH time window, the Zadoff-Chu sequence transmitted by the mobile phone that the mobile phone cannot communicate with the cell. The maximal number of Zadoff-Chu sequences that can be transmitted to the cell during the PRACH time window is a function of the coverage area (radius) of the cell. The search for the Zadoff-Chu sequence sis time and resource consuming and its duration may limit the maximal amount of Zadoff-Chu that can be successfully be searched during the PRACH time window and thus limit the coverage area of the cell.

There is a growing need to provide system and method for speeding up the search for Zadoff-Chu sequences during a physical random access channel search.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
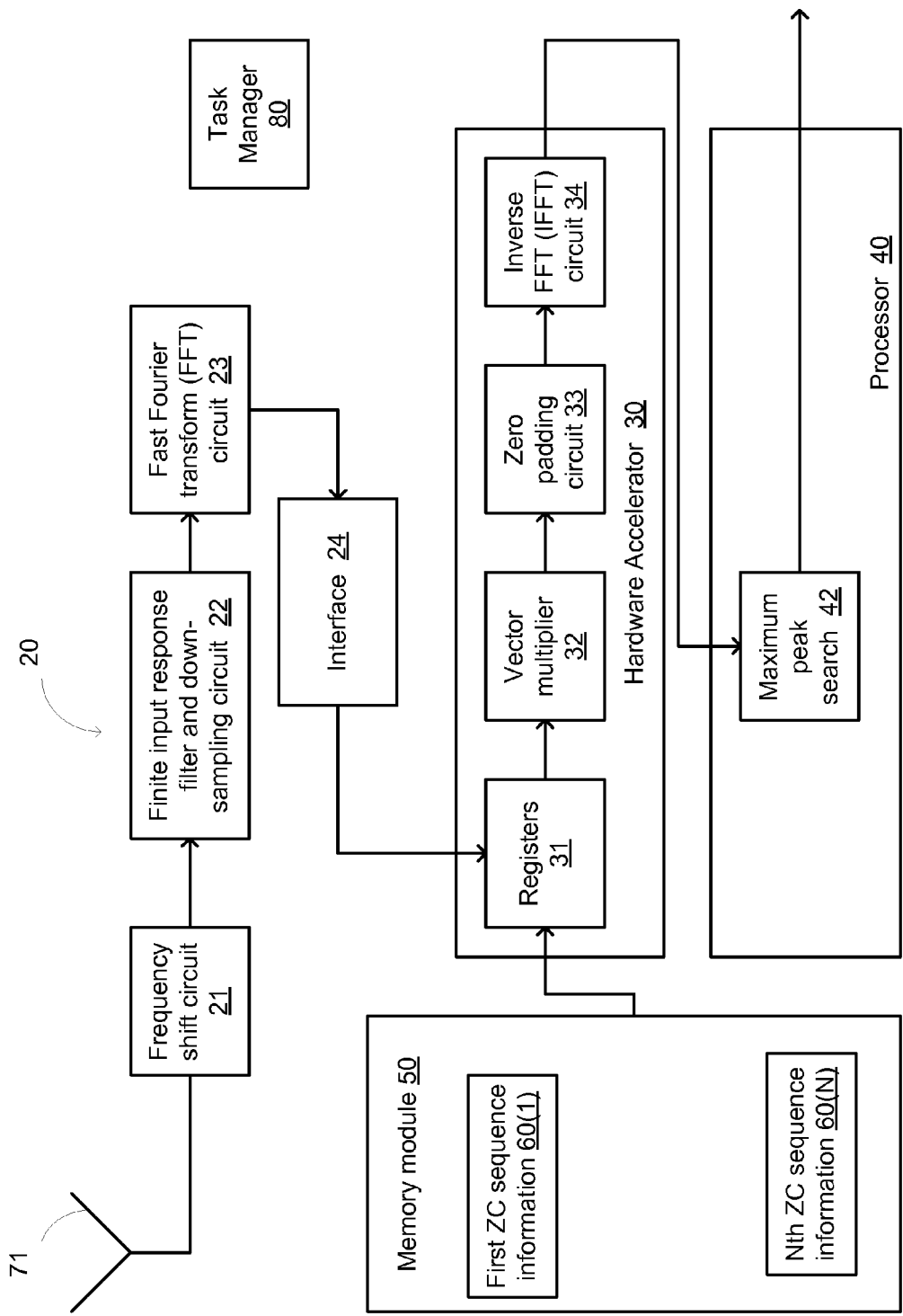
FIG. 1 is a schematic illustration of system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY

A system for searching for a set of Zadoff-Chu sequences, the system may include an interface that is arranged to receive a set of first antenna signals that represent input signals received by the first antenna; a processor; and a hardware accelerator; wherein the hardware accelerator is arranged to perform, for each Zadoff-Chu sequence of at least a first sub-set of the set of Zadoff-Chu sequences, a first hardware accelerator set of operations that comprises performing a frequency domain to time domain transformation of a second intermediate vector that is representative of multiplication of Zadoff-Chu sequence and a set of first received signals to provide a third intermediate vector that is associated with the Zadoff-Chu sequence; wherein the processor is arranged to perform, for each Zadoff-Chu sequence of at least a second sub-set of Zadoff-Chu sequences a first processor set of operations that comprises: performing a search, based on the third intermediate vector, to determine whether the set of first antenna signals included a representation of the Zadoff-Chu sequence; wherein the processor is arranged to execute the first processor set of operations related to a certain Zadoff-Chu sequence when the hardware accelerator is arranged to execute the first hardware accelerator set of operations relating to another Zadoff-Chu sequence.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

The following abbreviations are used in the figures:
FFT Fast Fourier transform
IFFT Inverse fast Fourier transform
ZC Zadoff-Chu
ZCS Zadoff-Chu sequence
HOA {ZC(n)} Hardware accelerator set of operation that is related to the n'th Zadoff-Chu sequence, 0<n<N+1.
HOA {ZC(n,k)} Hardware accelerator set of operation that is related to the n'th Zadoff-Chu sequence and to the k'th antenna, 0<n<N+1 and 0<k<K.
P{ZC(n)} Processor set of operation that is related to the n'th Zadoff-Chu sequence, 0<n<N+1.
P{ZC(n,k)} Processor set of operation that is related to the n'th Zadoff-Chu sequence and to the k'th antenna, 0<n<N+1 and 0<k<K.
SEARCH {ZC(n)} Entire search that is related to the n'th Zadoff-Chu sequence, 0<n<N+1.

The term processor refers to a component or device that can perform all the operations associated with a search for Zadoff-Chu sequence—vector multiplication, zero padding, IFFT, antenna combining and max peak search. It may be a general purpose processor, a digital signal processor and the like.

FIG. 1 is a schematic illustration of system 11 according to an embodiment of the invention.

FIG. 1 illustrates the components that are included in system 11 and also illustrates the function implemented by these components. For example processor 40 is a components while box 42 (maximum peak search) illustrates an operation executed by the processor. Yet for another example, boxes 21, 22 and 23 may represent operations executed by the processor 40 or other hardware component of system 11. It is further notes that each component or function can receive samples from memory module 50 and outputs samples to the memory module 50. Thus, although boxes 21-23, 31-34 and 42 form a sequence, they may not feed each other by samples—but each function and/or component can receive and/or fetch samples from the memory module 50. It is further noted that the processor 40 can perform vector multiplication in relation to at least some Zadoff-Chu sequences and thereby reduce the load off the hardware accelerator 30.

System 11 is illustrates as including first antenna 71, various pre-processing circuits such as frequency shift circuit 21, finite impulse response (FIR) filter and downsampling circuit 22, fast Fourier transform (FFT) circuit 23 and interface 24. These pre-processing circuits receive from first antenna 71 input signals and process them to provide a set of first antenna signals that represent the input signals received by the first antenna 71. It is noted that the processor 40 can perform at least some of the pre-processing operations represented by boxes 21-23.

For example, the first antenna 71 may receive during a PRACH time window 15360 samples that are converted by the frequency shift circuit 21 to a vector of 12313 samples. The FIR filter and downsampling circuit 22 receives the 12313 samples and outputs 1024 samples. The FFT receives these 1024 samples and outputs 1024 samples to interface 24 that outputs a 839 sample long vector to registers 31 of hardware accelerator 30. These registers 31 also receive one or more vectors representative of a Zadoff-Chu sequence that is being processed by the hardware accelerator 30.

FIG. 1 illustrates N Zadoff-Chu sequence information units (first ZC sequence information 60(1) till Nth ZC sequence information 60(N). A ZC sequence information may be calculated by applying a DFT function on a Zadoff-Chu sequence.

The ZC sequence information is 839 sample long and is multiplied by the vector multiplier 32 with the 839 sample long vector from the interface 24 to provide a first intermediate vector of 839 samples that is zero padded by zero padding circuit 33 to provide a second intermediate vector of 1024 samples. This second intermediate vector undergoes an IFFT conversion by IFFT circuit 34 to provide a third intermediate vector that can be sent to memory module 50 or to processor 40. Processor 20 applies a search such as a maximum peak search 42 to determine the presence of a Zadoff- Chu within the to determine whether the first input signals include information representative of the Zadoff-Chu sequence.

It is noted that any reference to a maximum peak search can be interpreted as including other types of search.

Figure 5:
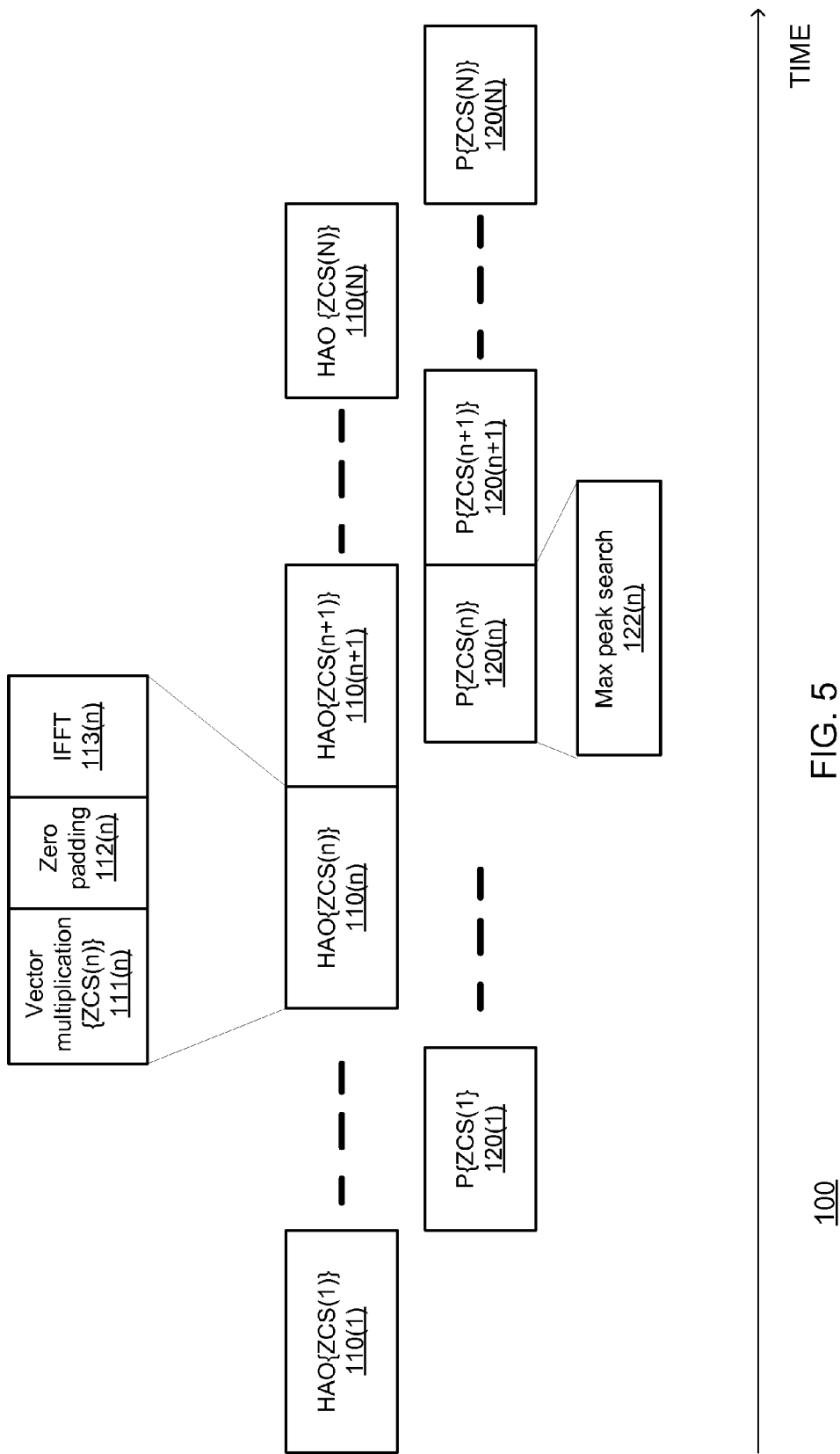
FIG. 5 is timing diagram according to an embodiment of the invention.
Figure 6:
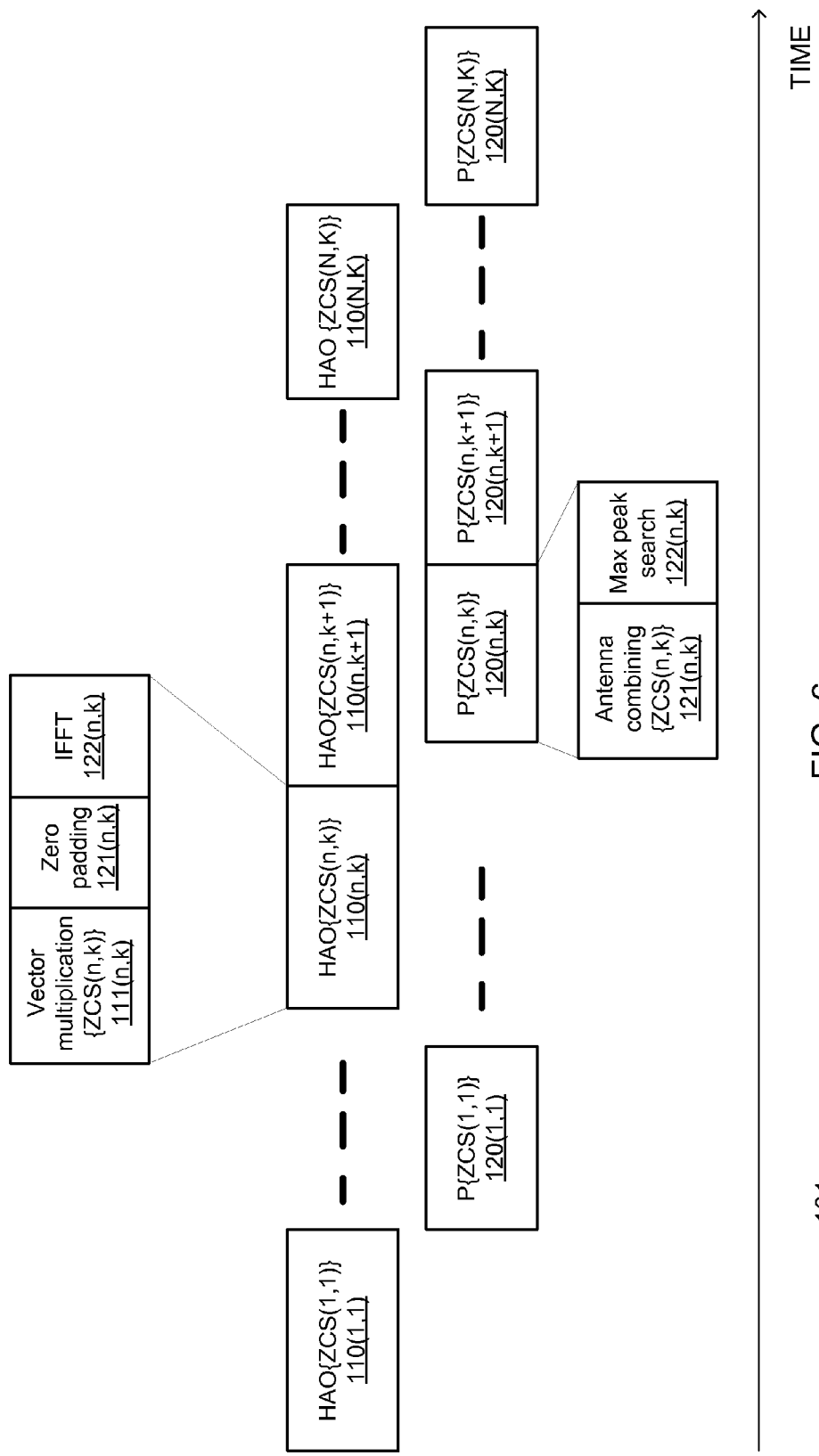
FIG. 6 is timing diagram according to an embodiment of the invention.

FIG. 5 is a timing diagram that illustrates the searches for N Zadoff-Chu sequences in a single antenna system where each one of the processor 40 and the hardware accelerator 30 partially searches each of the N Zadoff-Chu sequences.

The hardware accelerator 30 performs hardware processor sets of operations HAO{ZCS(1)}-HAO{ZCS(N)} 110(1)-110(N) while processor 40 (starting from the end of HAO{ZCS(1)}) performs processor sets of operations P{ZCS(1)}-P{ZCS(N)} 120(1)-120(N).

FIG. 5 shows that the n'th (n ranges between 1 and N) processor set of operations P{ZCS(n)} 120(n) includes maximum peak search 122(n) for the n'th Zadoff-Chu sequence.

FIG. 5 also shows that the n'th (n ranges between 1 and N) hardware accelerator set of operations HAO{ZCS(n)} 110(n) includes vector multiplication 111(n), zero padding 112(n) and IFFT 113(n) for the n'th Zadoff-Chu sequence.

According to an embodiment of the invention the processor 40 can solely perform the entire search (perform the vector multiplication, zero padding, IFFT and maximum peak search) while the hardware accelerator 30 cannot perform all these operations and may be limited to performing vector multiplication, zero padding and IFFT. Each one of the processor 40 and the hardware accelerator 30 can partially search (perform some operations out of the entire search process) for all of the Zadoff-Chu sequences (as illustrated in FIGS. 1, 3, 5 and 6)—the processor 40 may perform a processor set of operations and the hardware accelerator 30 can perform a hardware accelerator set of operations. If the system includes (or receives signals from) multiple (N) antennas these sets of operations are repeated for each antenna.

According to an embodiment of the invention the processor 40 may perform a processor set of operations relating to a certain Zadoff-Chu sequence while the hardware accelerator 30 can perform a hardware accelerator set of operations relating to another Zadoff-Chu sequence.

Figure 2:
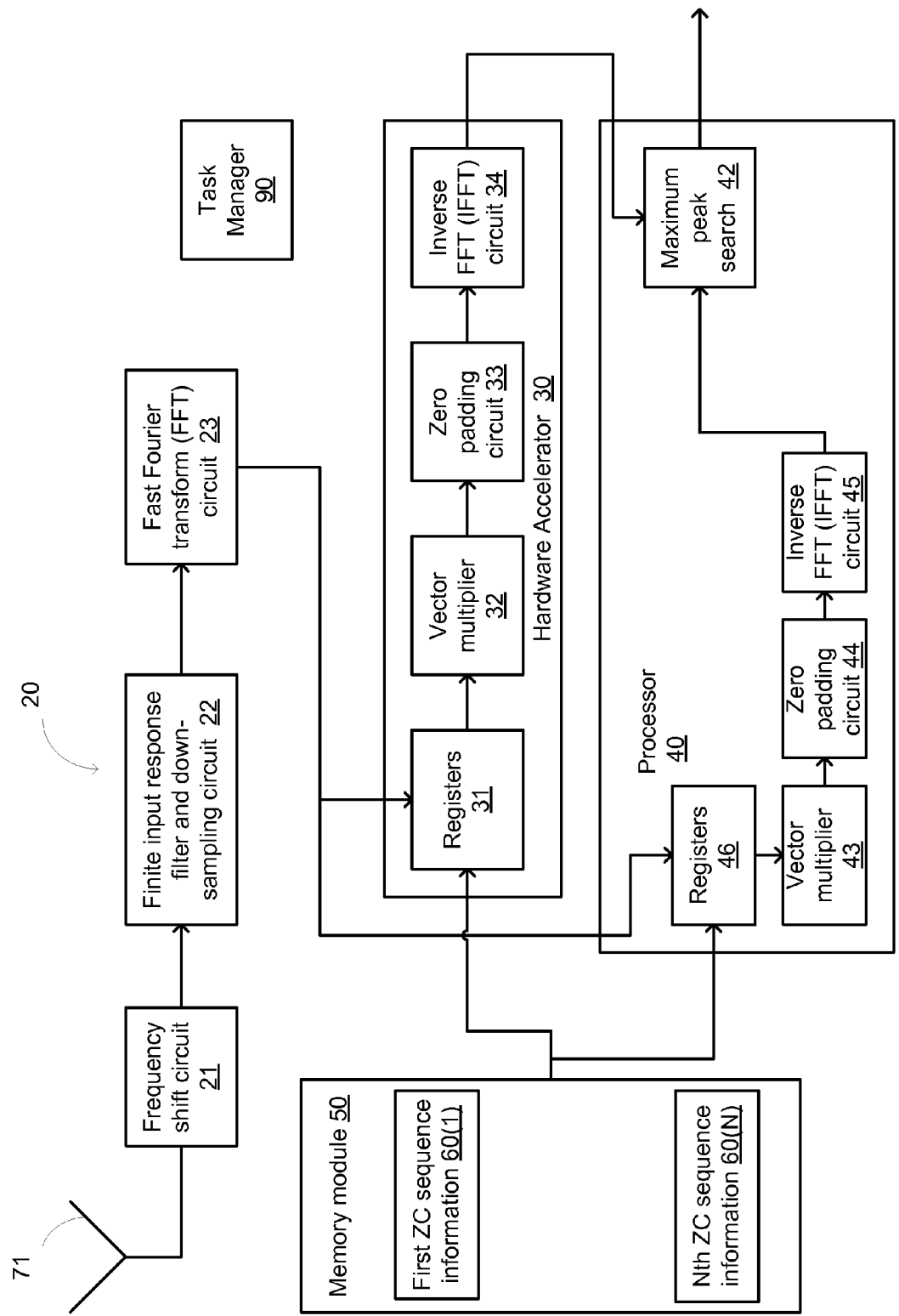
FIG. 2 is a schematic illustration of system according to an embodiment of the invention.
Figure 7:
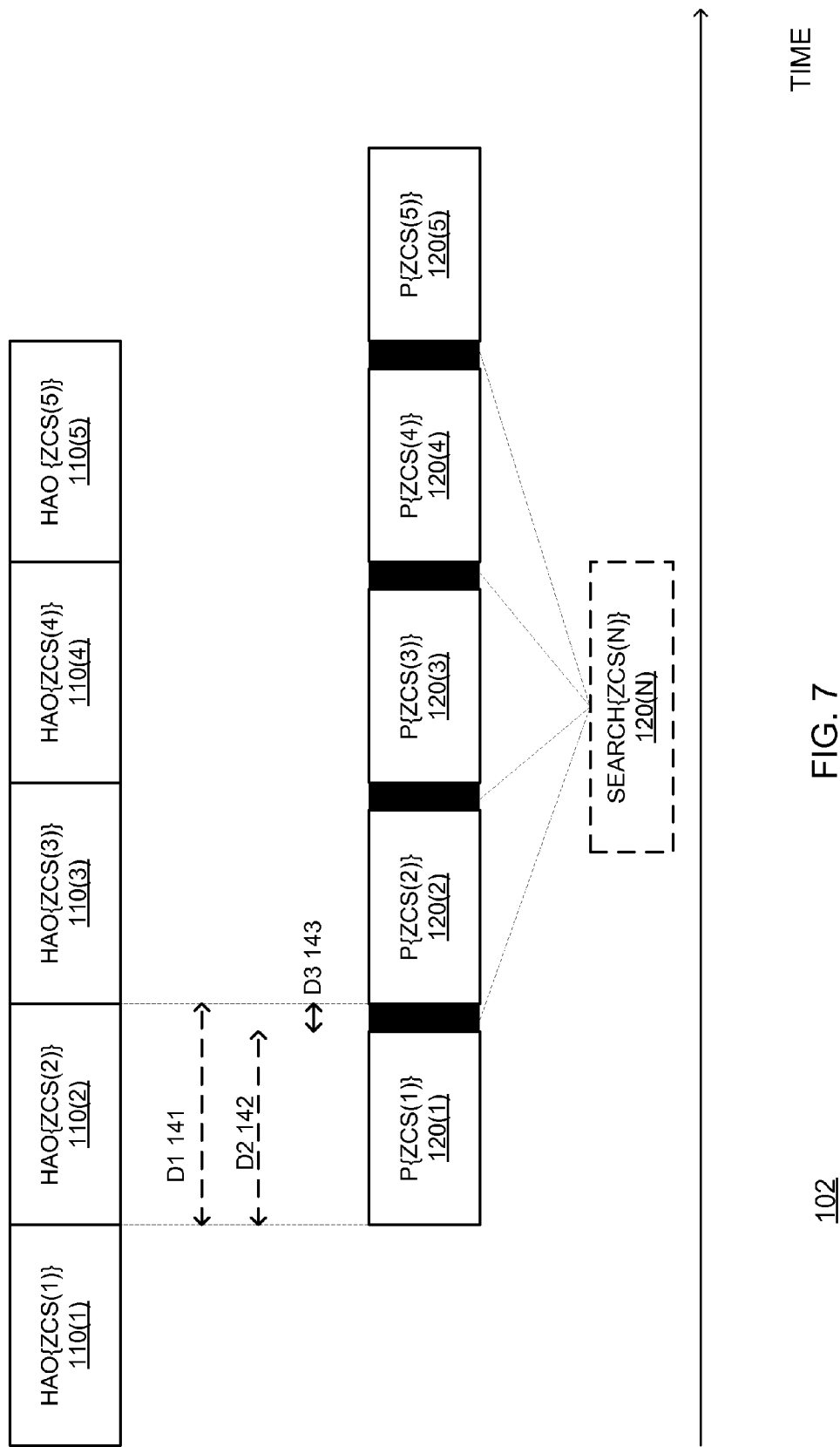
FIG. 7 is timing diagram according to an embodiment of the invention.
Figure 8:
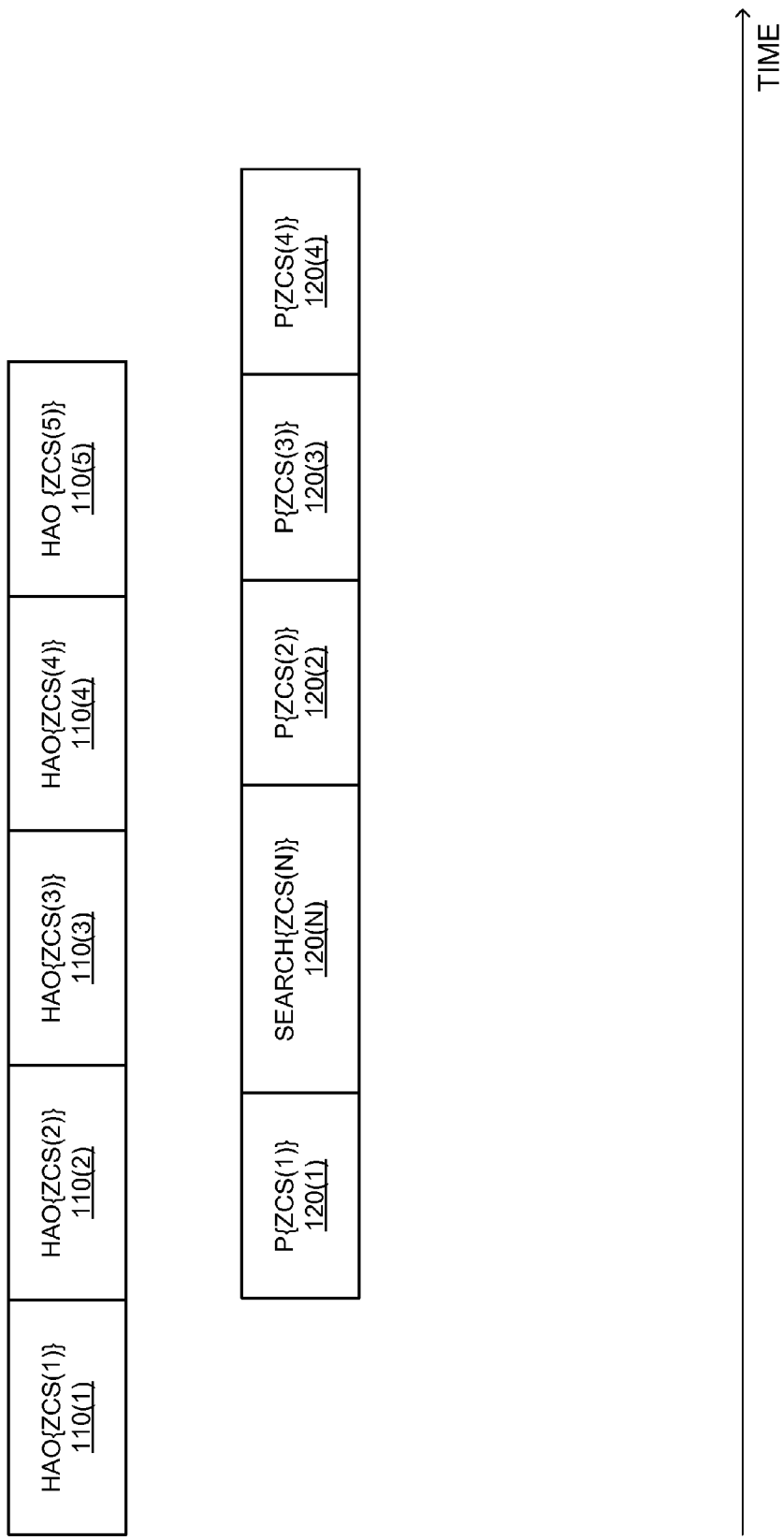
FIG. 8 is timing diagram according to an embodiment of the invention.

According to yet another embodiment of the invention the processor 40 and the hardware accelerator 30 may perform partial search of some Zadoff-Chu sequences while the processor 40 may perform the entire search relating to other (residual) Zadoff-Chu sequences, as illustrated in FIGS. 2, 7 and 8. Referring to FIG. 2—processor 40 performs for the residual Zadoff-Chu sequences the entire search (vector multiplication (43), zero padding (44), IFFT(45), and maximum peak search (42)) while preforming only antenna combining (41), and maximum peak search (42) for other Zadoff-Chu sequences.

This may occur when the duration (D1 141 of FIG. 7) of the execution of the hardware accelerator set of operations is longer than the duration (D2 142) of the execution of the processor set of operation by a time difference (D3 143) and the aggregation of such time differences during the entire search for the multiple Zadoff-Chu sequences is long enough to allow the processor to perform entire searches of residual Zadoff-Chu sequences.

FIG. 7 illustrates the segmentation (non-continuous execution) of a search process of the N'th Zadoff-Chu sequence between multiple time differences (black boxes). The hardware accelerator performs hardware processor sets of operations HAO{ZCS(1)}-HAO{ZCS(5)} 110(1)-110(5) while processor 40 (starting from the end of HAO{ZCS(1)}) performs processor sets of operations P{ZCS(1)}-P{ZCS(5)} 120(1)-120(5) as well as segments of an entire search operation (black boxes between P{ZCS(1)}-P{ZCS(5)} that represent segments of SEQRCH{ZCS(N)} 120(N).

FIG. 8 illustrates a non-segmented (continuous) execution of such a search—SEARCH{ZCS(N)} 120(N) is executed between an execution of a processor set of operations relating to a first Zadoff-Chu sequence P{ZCS(1)} 120(1) and an execution of a processor set of operations relating to a second Zadoff-Chu sequence P{ZCS(2)} 120(2).

Figure 4:
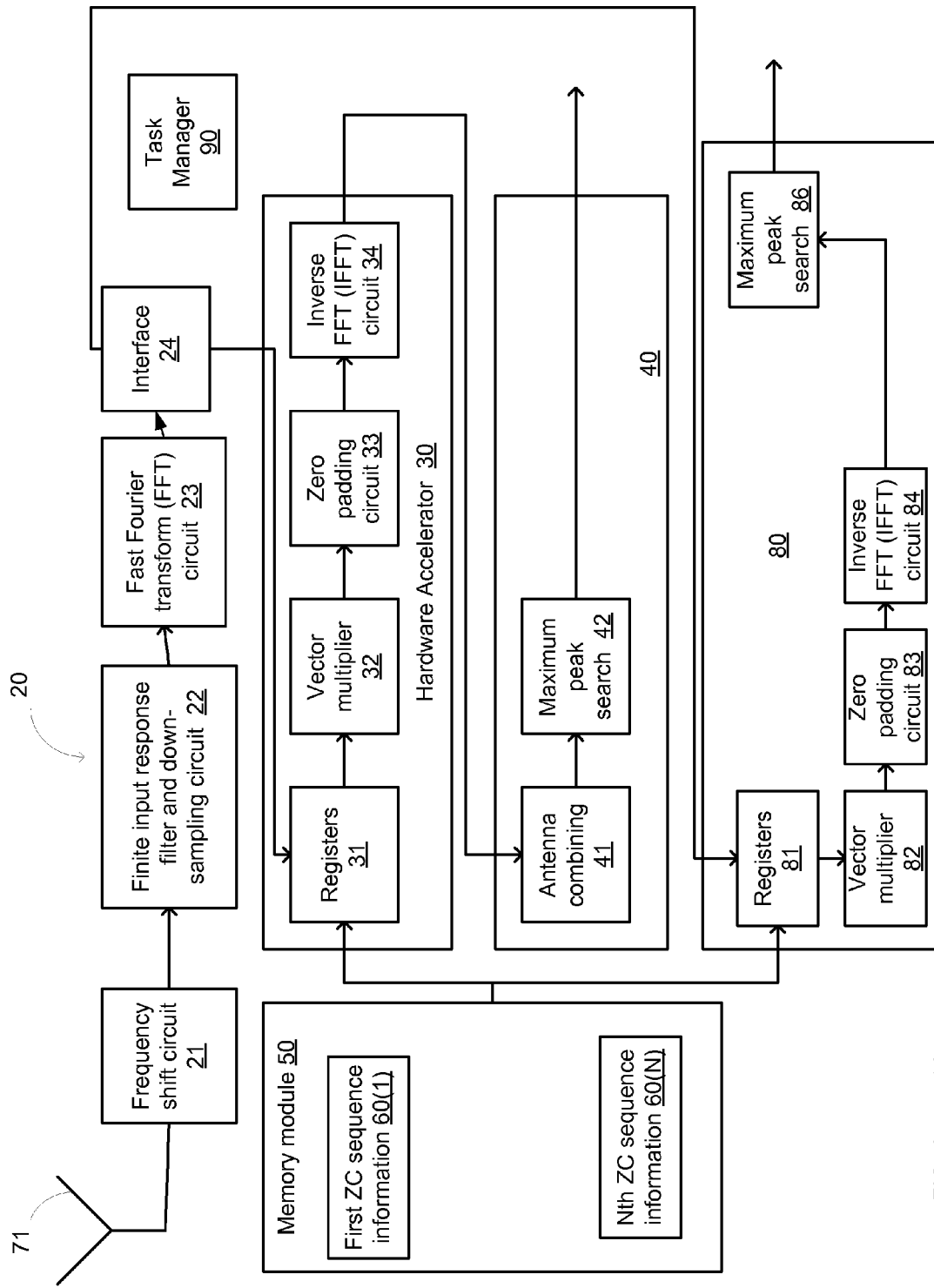
FIG. 4 is a schematic illustration of system according to an embodiment of the invention.

Yet according to another embodiment of the invention the system may include two processors and a single hardware accelerator (FIG. 4—system 14 includes hardware accelerator 30, processors 40 and additional processor 80) and while the processor 40 and the hardware accelerator 30 partially search for some Zadoff-Chu sequences the additional processor 80 solely searches for other Zadoff-Chu sequences—it may perform vector multiplication (82), zero padding (83), IFFT (84), and maximum peak search (86).

It is noted that each system may include a task manager 90 that may be arranged to schedule the search and partial search operations between the different components of the system and that this scheduling may take into account the different duration of execution of different operations by the different components of the system and the limitations of the various components.

According to an embodiment of the invention the processor 40 and the hardware accelerator 30 can operate (at least partially) in a pipelined manner.

The hardware accelerator 30 is arranged to perform, for each Zadoff-Chu sequence of at least a first sub-set of the set of Zadoff-Chu sequences, a first hardware accelerator set of operations that may include: (a) multiplying (32) the set of first received signals by a vector representative of the Zadoff-Chu sequence to provide a first intermediate vector; (b) zero padding (33) the first intermediate vector to provide a second intermediate vector; and (c) performing a frequency domain to time domain transformation (such as IFFT by IFFT circuit 34) of the second intermediate vector to provide a third intermediate vector that is associated with the Zadoff-Chu sequence.

Figure 13:
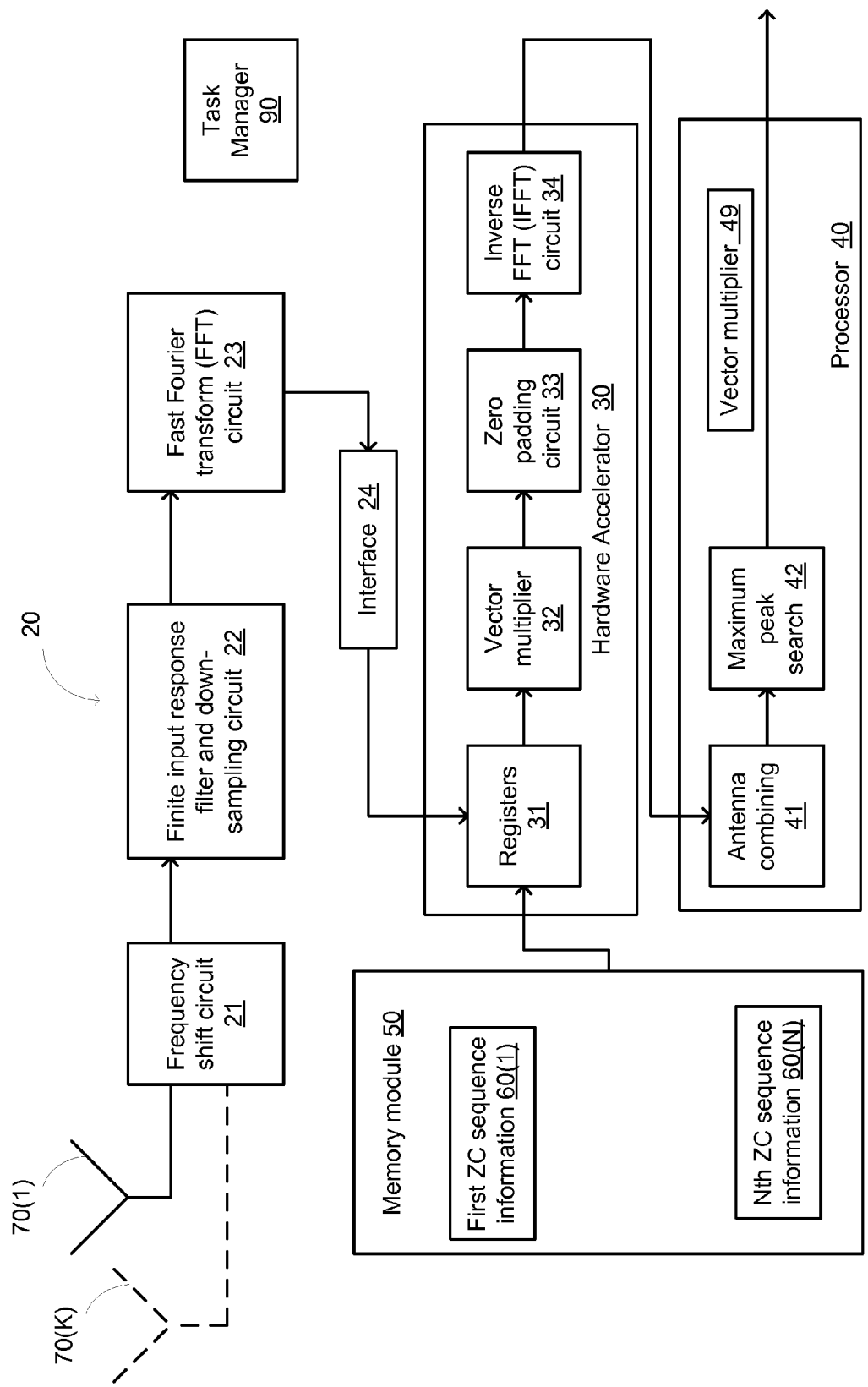
FIG. 13 is a schematic illustration of system according to an embodiment of the invention.
Figure 14:
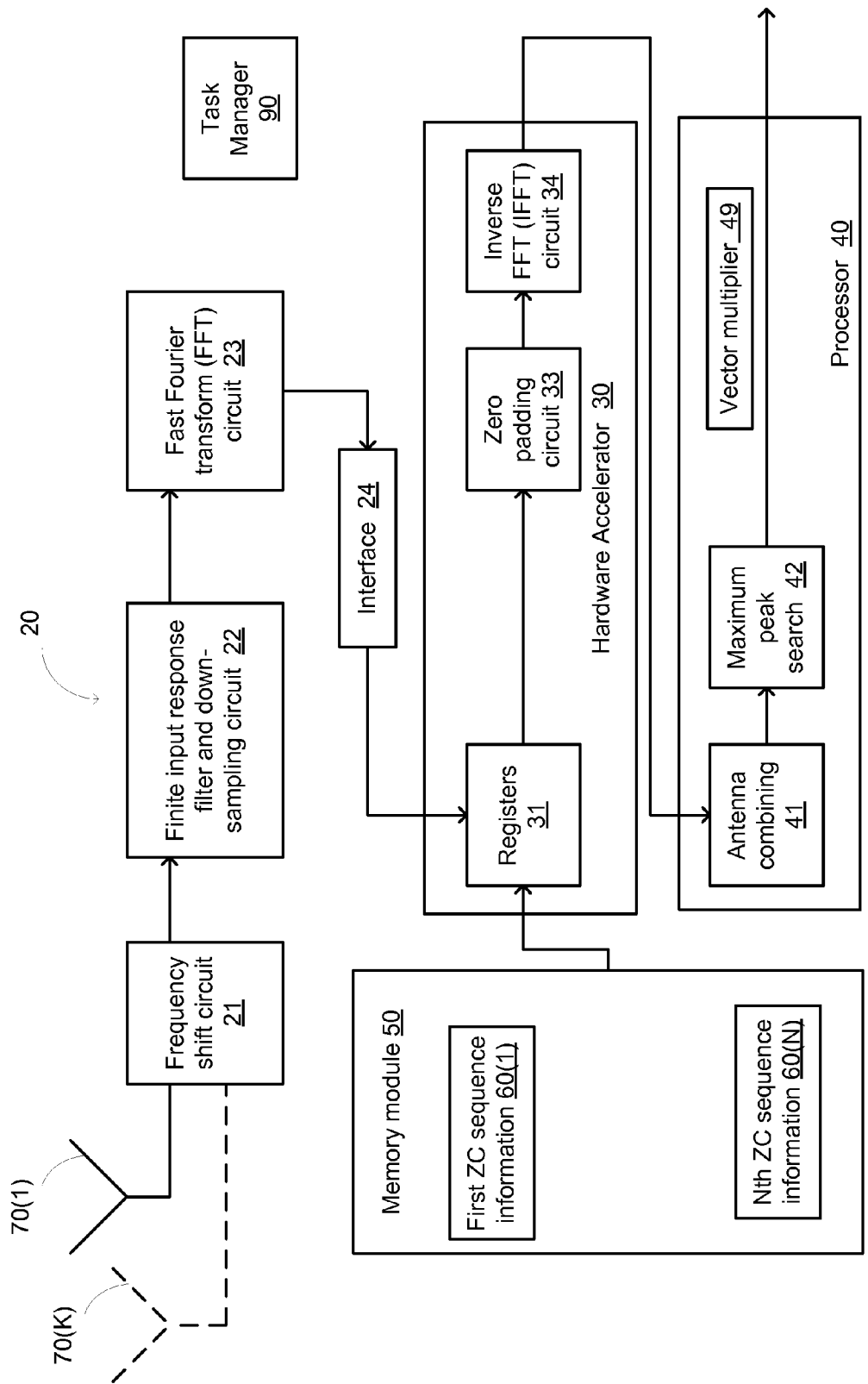
FIG. 14 is a schematic illustration of system according to an embodiment of the invention.
Figure 15:
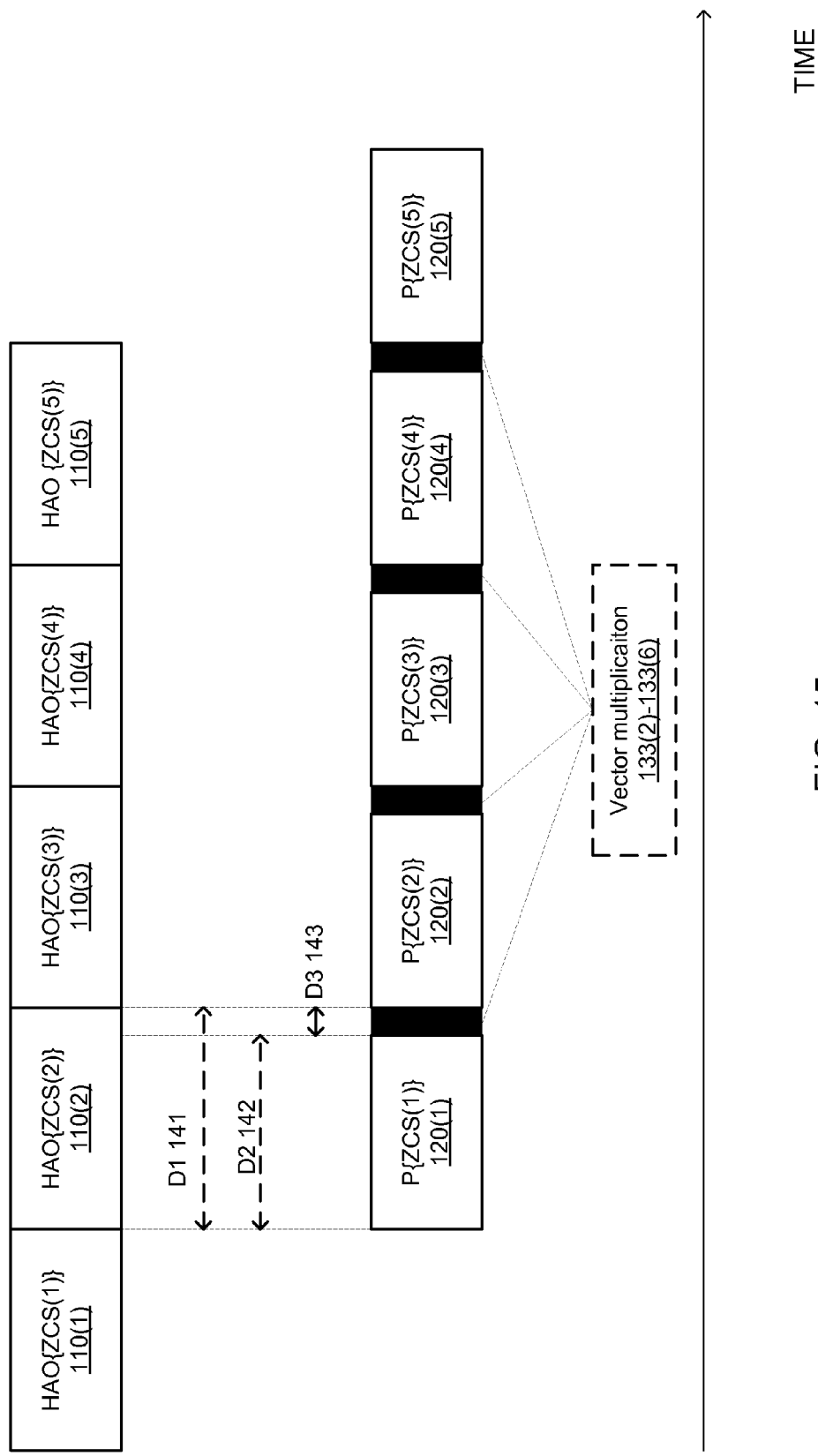
FIG. 15 is timing diagram according to an embodiment of the invention.

It is noted that the multiplying (32) and additionally or alternatively, the zero padding (33) can be executed, for at least some of the Zadoff-Chu sequences, by the processor 40 and that in that case the first hardware accelerator set of operations may include the IFFT operation. FIG. 13 illustrates system 15 in which some of the vector multiplications are executed by the hardware accelerator and some by the processor (box 49) while FIG. 14 illustrates a system 16 in which all the vector multiplications (box 49) are executed by the processor 40. FIG. 15 is a timing diagram that illustrated a non-continuous execution of vector multiplications 133(2)-133(6) that are executed by the processor 40.

The processor 40 may be arranged to perform, for each Zadoff-Chu sequence of at least a second sub-set of Zadoff-Chu sequences a first processor set of operations that includes performing a search (42) or any other type of search, based on the third intermediate vector, to determine whether the set of first antenna signals included a representation of the Zadoff-Chu sequence.

According to an embodiment of the invention each one of the processor 40 and the hardware accelerator 30 is arranged to fetch information required for partially searching for two or more Zadoff-Chu sequences at a time and to partially search for the two or more Zadoff-Chu sequences before fetching information required for searching other two or more Zadoff-Chu sequences.

Figure 3:
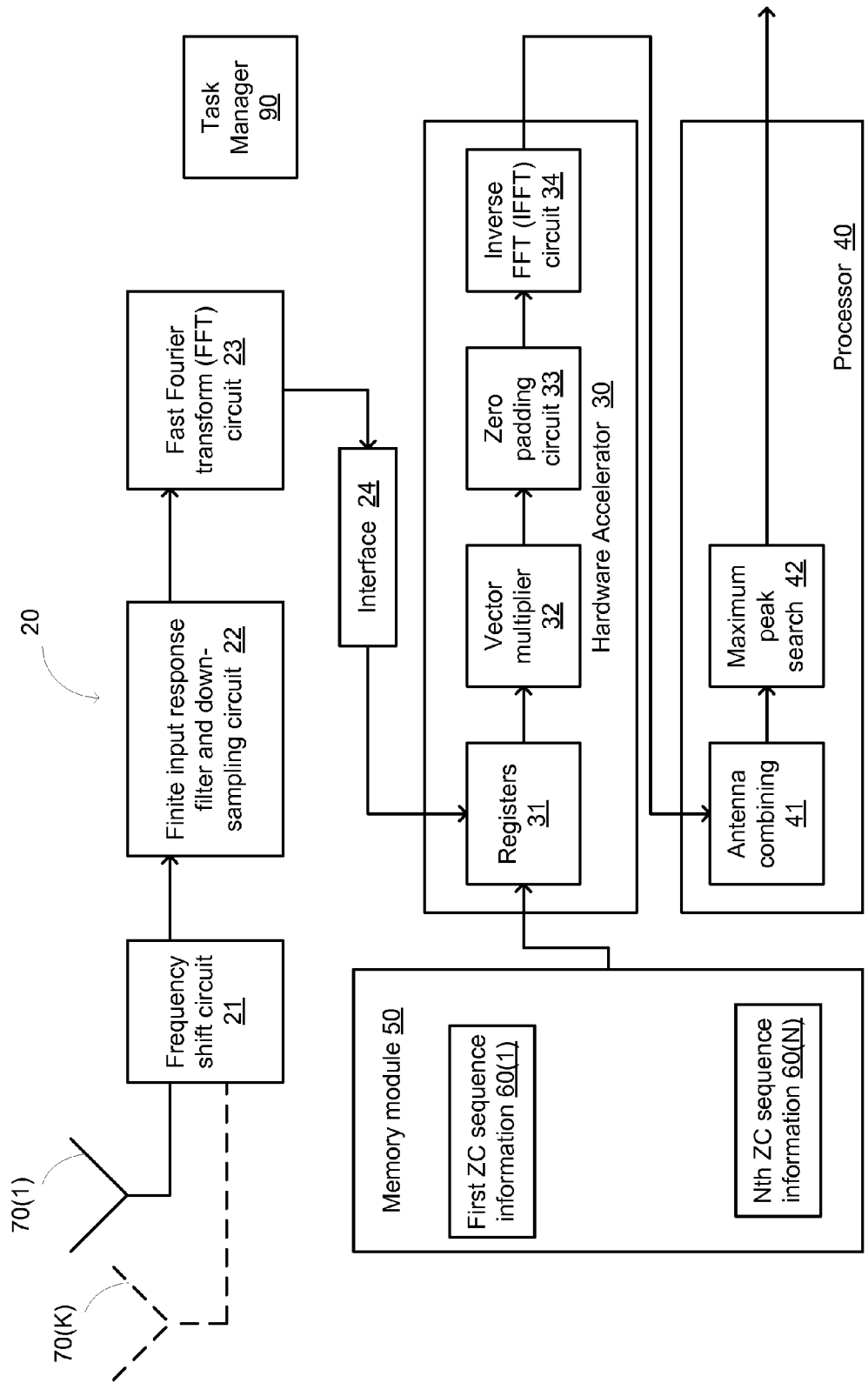
FIG. 3 is a schematic illustration of system according to an embodiment of the invention.

FIG. 3 illustrate system 13 according to an embodiment of the invention. System 13 includes multiple (K) antennas such as antennas 70(1)-70(K). The signals from the multiple antennas may be processed in manners that may be equivalent to any of the mentioned above configurations (partial search by the processor 40 and the hardware accelerator 30 for all Zadoff-Chu sequences, partial search for some Zadoff-Chu sequences and solely searching for some residual Zadoff-Chu sequences by the processor or by an additional processor). The processing of signals from multiple antennas differs from the processing of signals from a single antenna by performing an antenna combining operation in which values obtained from different antennas (for example—the third intermediate vector and a sixth intermediate vector) are combined while the vector multiplication, zero padding, IFFT and executed in separate for the input signals of each antenna. The operations applied on signals from different antennas can be executed in a serial manner, a partially overlapping manner or in parallel by the processor and/or the hardware accelerator.

For example, referring to FIG. 3 and assuming a pair of antennas (K=2) then the interface 24 is further arranged to receive a set of second antenna signals that represent input signals received by the second antenna. The hardware accelerator 30 is further arranged to perform, for each Zadoff-Chu sequence of at least the first sub-set of the set of Zadoff-Chu sequences, a second hardware accelerator set of operations that includes: (a) multiplying the set of second antenna signals by the vector representative of the Zadoff-Chu sequence to provide a fourth intermediate vector; (b) zero padding the fourth intermediate vector to provide a fifth intermediate vector; and (c) performing a frequency domain to time domain transformation of the fifth intermediate vector to provide a sixth intermediate vector that is associated with the Zadoff-Chu sequence. The processor 40 is arranged to perform, for each Zadoff-Chu sequence of at least the second sub-set of Zadoff-Chu sequences a second processor set of operations that includes (a) combining a square of the third intermediate vector with a square of the sixth intermediate vector to provide a second intermediate value; and (b) performing a search, based on the second intermediate value, to determine whether the set of first received signals included a representation of the Zadoff-Chu sequence. The processor is arranged to execute a second processor set of operations related to a certain Zadoff-Chu sequence when the hardware accelerator is arranged to execute a second hardware accelerator set of operations relating to another Zadoff-Chu sequence.

FIGS. 9-12 illustrate methods 201, 202, 203 and 204 for searching for a set of Zadoff-Chu sequences, according to an embodiment of the invention.

Figure 9:
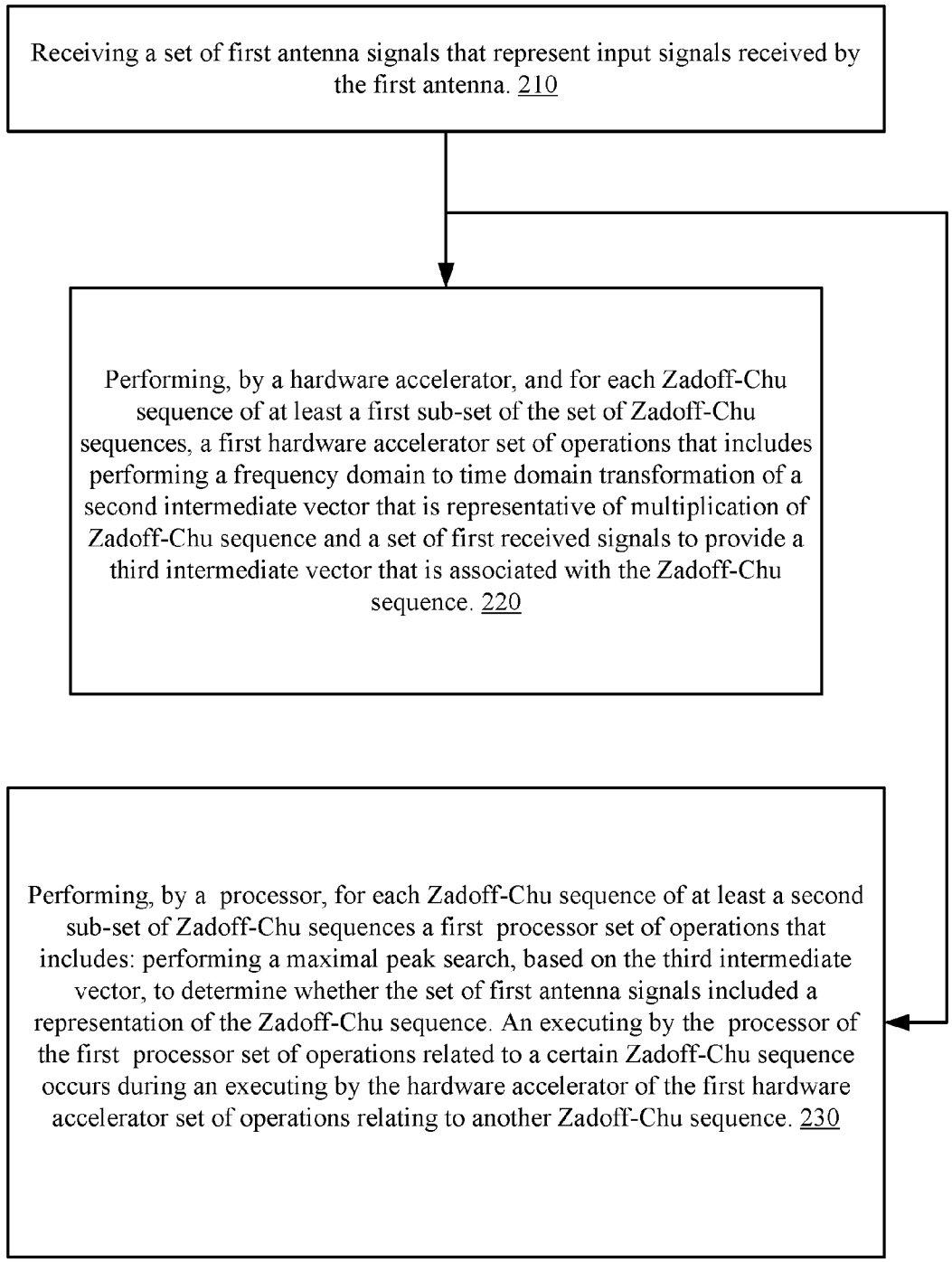
FIG. 9 illustrates a method according to an embodiment of the invention.

Method 201 of FIG. 9 starts by stage 210 of receiving a set of first antenna signals that represent input signals received by the first antenna.

Stage 210 is followed by stages 220 and 230.

Stage 220 may include performing, by a hardware accelerator, and for each Zadoff-Chu sequence of at least a first sub-set of the set of Zadoff-Chu sequences, a first hardware accelerator set of operations that includes performing a frequency domain to time domain transformation of a second intermediate vector that is representative of multiplication of Zadoff-Chu sequence and a set of first received signals to provide a third intermediate vector that is associated with the Zadoff-Chu sequence.

Stage 220 may include performing, by a hardware accelerator, and for each Zadoff-Chu sequence of at least a first sub-set of the set of Zadoff-Chu sequences, a first hardware accelerator set of operations that includes multiplying the set of first received signals by a vector representative of the Zadoff-Chu sequence to provide a first intermediate vector; zero padding the first intermediate vector to provide a second intermediate vector; and performing a frequency domain to time domain transformation of the second intermediate vector to provide a third intermediate vector that is associated with the Zadoff-Chu sequence.

It is noted that the method may include performing by the processor, for at least some of the Zadoff-Chu sequences, a multiplying the set of first received signals by a vector representative of the Zadoff-Chu sequence to provide a first intermediate vector and nay include, additionally or alternatively, zero padding the first intermediate vector to provide a second intermediate vector.

Stage 230 includes performing, by a processor, for each Zadoff-Chu sequence of at least a second sub-set of Zadoff-Chu sequences a first processor set of operations that includes: performing a search, based on the third intermediate vector, to determine whether the set of first antenna signals included a representation of the Zadoff-Chu sequence. The executing by the processor of the first processor set of operations related to a certain Zadoff-Chu sequence occurs during an executing by the hardware accelerator of the first hardware accelerator set of operations relating to another Zadoff-Chu sequence.

Figure 10:
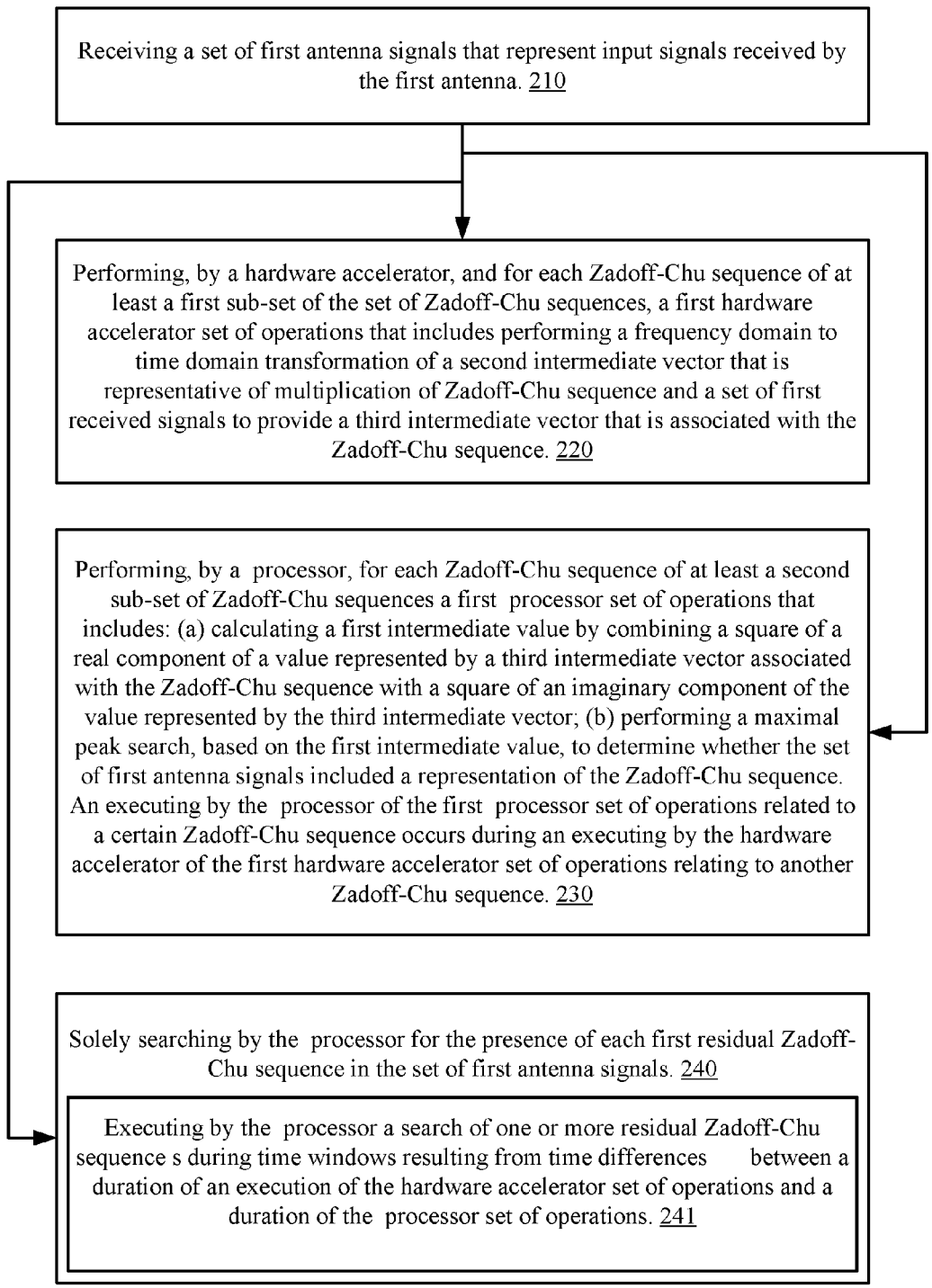
FIG. 10 illustrates a method according to an embodiment of the invention.

Method 202 of FIG. 10 differs from method 201 of FIG. 9 by including stage 240 that also follows stage 210. Stage 240 may include stage 241. Stage 240 includes solely searching by the processor for the presence of each first residual Zadoff-Chu sequence in the set of first antenna signals.

Stage 240 may include executing by the processor a search of one or more residual Zadoff-Chu sequence in a non-continuous (segmented—see FIG. 7) manner or in a continuous manner (FIG. 8).

Stage 241 may include executing by the processor a search of one or more residual Zadoff-Chu sequence s during time windows resulting from time differences between a duration of an execution of the hardware accelerator set of operations and a duration of the processor set of operations.

Figure 11:
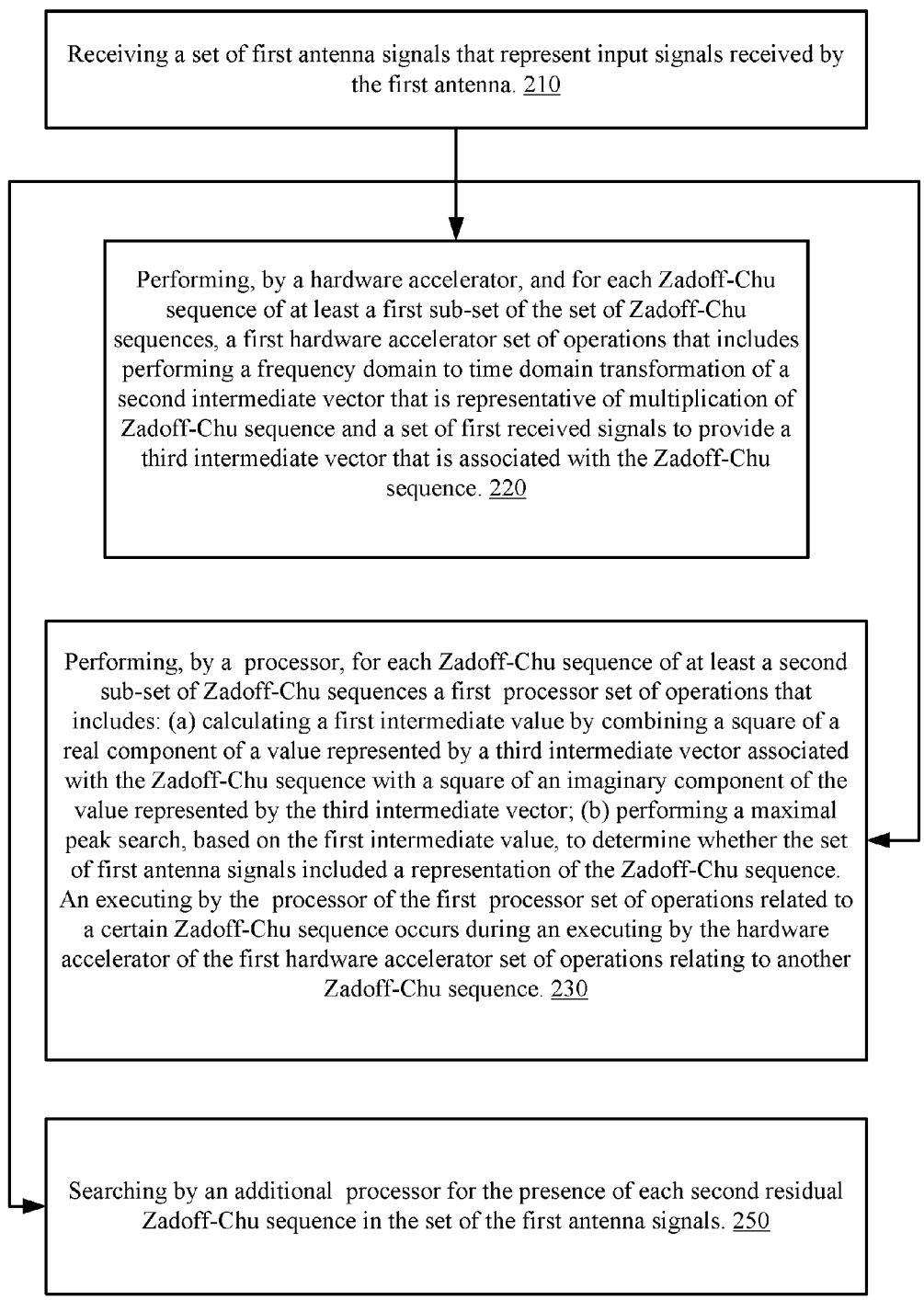
FIG. 11 illustrates a method according to an embodiment of the invention.

Method 203 of FIG. 11 differs from method 201 of FIG. 9 by including stage 250 that also follows stage 210.

Stage 250 may include solely searching by an additional processor (for example—see FIG. 4) for the presence of each second residual Zadoff-Chu sequence in the set of the first antenna signals.

Each on of methods 201-204 may include fetching by the processor and the hardware accelerator information required for partially searching for two or more Zadoff-Chu sequences at a time and to partially searching for the two or more Zadoff-Chu sequences before fetching information required for searching other two or more Zadoff-Chu sequences.

Figure 12:
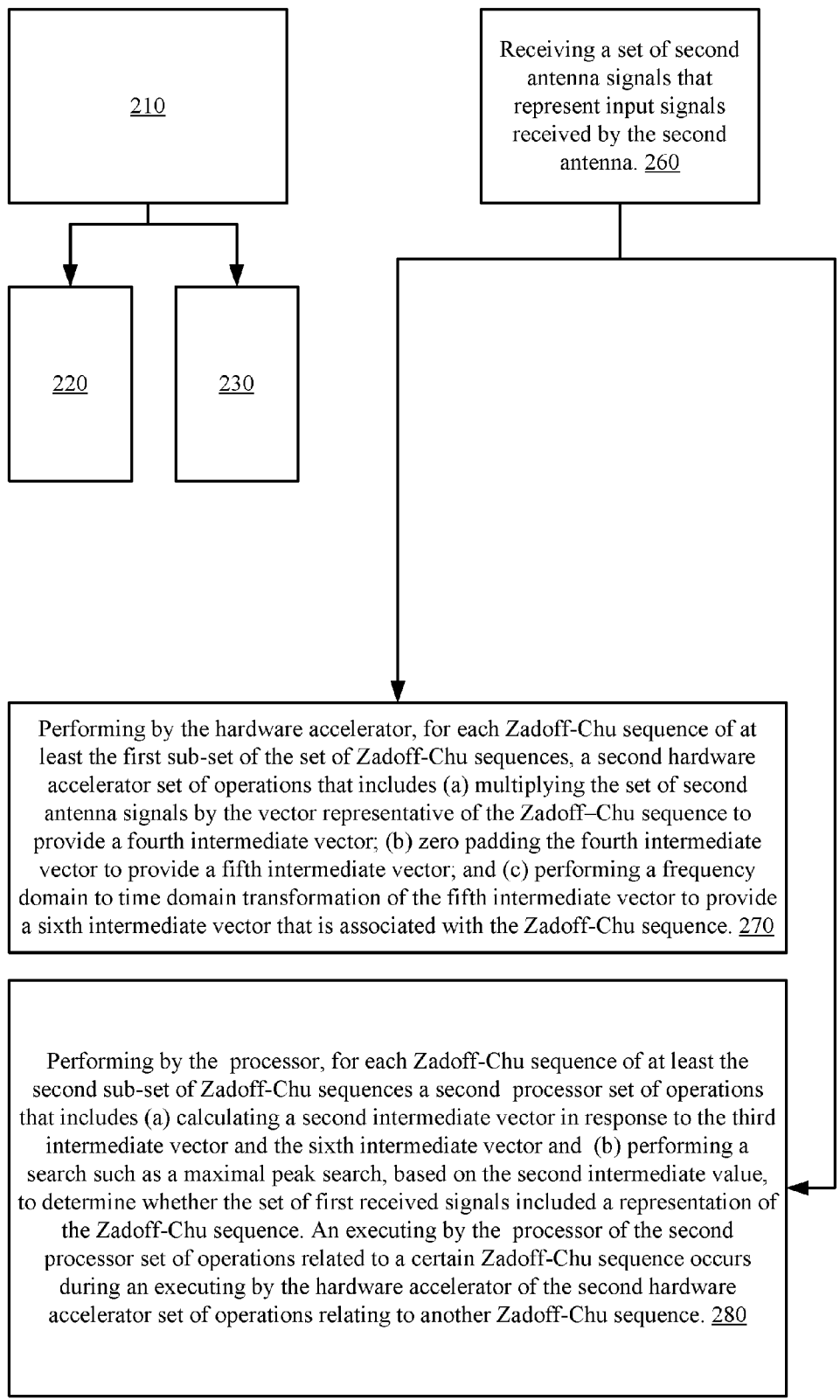
FIG. 12 illustrates a method according to an embodiment of the invention.

Method 204 of FIG. 12 differs from method 201 of FIG. 9 by including stages 260, 270 and 280 that are executed in parallel to stages 210, 220 and 230 of method 201.

Stage 260 includes receiving a set of second antenna signals that represent input signals received by the second antenna.

Stage 260 may be followed by stages 270 and 280.

Stage 270 includes performing by the hardware accelerator, for each Zadoff-Chu sequence of at least the first sub-set of the set of Zadoff-Chu sequences, a second hardware accelerator set of operations that may include multiplying the set of second antenna signals by the vector representative of the Zadoff-Chu sequence to provide a fourth intermediate vector; zero padding the fourth intermediate vector to provide a fifth intermediate vector; and performing a frequency domain to time domain transformation of the fifth intermediate vector to provide a sixth intermediate vector that is associated with the Zadoff-Chu sequence.

Stage 270 may include performing by the processor, for each Zadoff-Chu sequence of at least the second sub-set of Zadoff-Chu sequences a second processor set of operations that includes calculating a second intermediate vector in response to the third intermediate vector and the sixth intermediate vector. This may include combining the square of the third intermediate vector with a square of the sixth intermediate vector. Stage 270 may also include performing a search, such as a maximal peak search based on the second intermediate value, to determine whether the set of first received signals included a representation of the Zadoff-Chu sequence.

The executing by the processor of the second processor set of operations related to a certain Zadoff-Chu sequence occurs during an executing by the hardware accelerator of the second hardware accelerator set of operations relating to another Zadoff-Chu sequence.

Method 204 can be applied, mutatis mutandis, on a processing of signals from more than two antennas.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for searching for a set of Zadoff-Chu sequences, the system comprises:
    an interface that is arranged to receive a set of first antenna signals that represent input signals received by the first antenna;
    a processor; and
    a hardware accelerator;
    wherein the hardware accelerator is arranged to perform, for each Zadoff-Chu sequence of at least a first sub-set of the set of Zadoff-Chu sequences, a first hardware accelerator set of operations that comprises performing a frequency domain to time domain transformation of a second intermediate vector that is representative of multiplication of Zadoff-Chu sequence and the set of first antenna signals to provide a third intermediate vector that is associated with the Zadoff-Chu sequence;
    wherein the processor is arranged to perform, for each Zadoff-Chu sequence of at least a second sub-set of Zadoff-Chu sequences, a first processor set of operations that comprises:
        performing a search, based on the third intermediate vector, to determine whether the set of first antenna signals included a representation of the Zadoff-Chu sequence;
    wherein the processor is arranged to execute the first processor set of operations related to a certain Zadoff-Chu sequence when the hardware accelerator is arranged to execute the first hardware accelerator set of operations relating to another Zadoff-Chu sequence;
    wherein the at least first sub-set of the set of Zadoff-Chu sequences does not include at least one first residual Zadoff-Chu sequence of the set of Zadoff-Chu sequences; and wherein the processor is arranged to solely search for the presence of each first residual Zadoff-Chu sequence in the set of first antenna signals; and
    wherein the processor is arranged to execute a search of one or more residual Zadoff-Chu sequences in a non-continuous manner and during time windows resulting from time differences between a duration of an execution of the hardware accelerator set of operations and a duration of the processor set of operations.

2. The system according to claim 1, wherein the at least first sub-set of the set of Zadoff-Chu sequences comprises the set of Zadoff-Chu sequences.

3. The system according to claim 1, further comprising an additional processor; wherein the second sub-set of Zadoff-Chu sequences does not include at least one second residual Zadoff-Chu sequences and wherein the additional processor is arranged to solely search for the presence of each second residual Zadoff-Chu sequence in the set of the first antenna signals.

4. The system according to claim 1, wherein each one of the processor and the hardware accelerator are arranged to fetch information required for partially searching for two or more Zadoff-Chu sequences at a time and to partially search for the two or more Zadoff-Chu sequences before fetching information required for searching other two or more Zadoff-Chu sequences.

5. The system according to claim 1, wherein the interface is further arranged to receive a set of second antenna signals that represent input signals received by the second antenna;
    wherein the hardware accelerator is further arranged to perform, for each Zadoff-Chu sequence of at least the first sub-set of the set of Zadoff-Chu sequences, a second hardware accelerator set of operations that comprises:
        performing a frequency domain to time domain transformation of a fifth intermediate vector to provide a sixth intermediate vector that is associated with the Zadoff-Chu sequence;
    wherein the processor is arranged to perform, for each Zadoff-Chu sequence of at least the second sub-set of Zadoff-Chu sequences a second processor set of operations that comprises:
        calculating a second intermediate vector in response to the third intermediate vector and the sixth intermediate vector; and performing a search, based on the second intermediate vector, to determine whether the set of first antenna signals included a representation of the Zadoff-Chu sequence;

wherein the processor is arranged to execute a second processor set of operations related to a certain Zadoff-Chu sequence when the hardware accelerator is arranged to execute a second hardware accelerator set of operations relating to another Zadoff-Chu sequence.

6. The system according to claim 1 wherein the hardware accelerator differs from the processor and comprises a vector multiplier, registers, a zero padding circuit and a frequency domain to time domain transformation circuit.

7. The system according to claim 1, wherein at least one of the processor and the hardware accelerator is arranged to multiply the set of first antenna signals by a vector representative of the Zadoff-Chu sequence to provide a first intermediate vector; and zero pad the first intermediate vector to provide the second intermediate vector.

8. A method for searching for a set of Zadoff-Chu sequences, the method comprises:

performing by a hardware accelerator, for each Zadoff-Chu sequence of at least a first sub-set of the set of Zadoff-Chu sequences, a first hardware accelerator set of operations that comprises performing a frequency domain to time domain transformation of a second intermediate vector that is representative of multiplication of Zadoff-Chu sequence and a set of first antenna signals to provide a third intermediate vector that is associated with the Zadoff-Chu sequence;

performing, by a processor, for each Zadoff-Chu sequence of at least a second sub-set of Zadoff-Chu sequences a first processor set of operations that comprises: performing a search, based on the third intermediate vector, to determine whether the set of first antenna signals included a representation of the Zadoff-Chu sequence;

wherein an executing by the processor of the first processor set of operations related to a certain Zadoff-Chu sequence occurs during an executing by the hardware accelerator of the first hardware accelerator set of operations relating to another Zadoff-Chu sequence;

wherein the at least first sub-set of the set of Zadoff-Chu sequences does not include at least one first residual Zadoff-Chu sequence of the set of Zadoff-Chu sequences; and wherein the method comprises:

solely searching by the processor for the presence of each first residual Zadoff-Chu sequence in the set of first antenna signals;

executing by the processor a search of one or more residual Zadoff-Chu sequences in a non-continuous manner and during time windows resulting from time differences between a duration of an execution of the hardware accelerator set of operations and a duration of the processor set of operations.

9. The method according to claim 8, wherein the second sub-set of Zadoff-Chu sequences does not include at least one second residual Zadoff-Chu sequences and wherein the method comprises solely searching by an additional processor for the presence of each second residual Zadoff-Chu sequence in the set of the first antenna signals.

10. The method according to claim 8, comprising fetching by the processor and the hardware accelerator information required for partially searching for two or more Zadoff-Chu sequences at a time and to partially searching for the two or more Zadoff-Chu sequences before fetching information required for searching other two or more Zadoff-Chu sequences.

11. The method according to claim 8, further comprising:

receiving a set of second antenna signals that represent input signals received by the second antenna;

performing by the hardware accelerator, for each Zadoff-Chu sequence of at least the first sub-set of the set of Zadoff-Chu sequences, a second hardware accelerator set of operations that comprises performing a frequency domain to time domain transformation of a fifth intermediate vector to provide a sixth intermediate vector that is associated with the Zadoff-Chu sequence;

performing by the processor, for each Zadoff-Chu sequence of at least the second sub-set of Zadoff-Chu sequences a second processor set of operations that comprises: calculating a second intermediate vector in response to the third intermediate vector and the sixth intermediate vector; and performing a search, based on the second intermediate vector, to determine whether the set of first antenna signals included a representation of the Zadoff-Chu sequence;

wherein an execution of a second processor set of operations related to a certain Zadoff-Chu sequence is performed during an execution of a second hardware accelerator set of operations relating to another Zadoff-Chu sequence.

12. A non-transitory computer readable medium that stores instructions that once executed by a computerized system that comprises a hardware accelerator and a processor causes the computerized system to execute the stages of:

performing by the hardware accelerator, for each Zadoff-Chu sequence of at least a first sub-set of the set of Zadoff-Chu sequences, a first hardware accelerator set of operations that comprises performing a frequency domain to time domain transformation of a second intermediate vector that is representative of multiplication of Zadoff-Chu sequence and a set of first antenna signals to provide a third intermediate vector that is associated with the Zadoff-Chu sequence:

performing, by the processor, for each Zadoff-Chu sequence of at least a second sub-set of Zadoff-Chu sequences a first processor set of operations that comprises: performing a search, based on the third intermediate vector, to determine whether the set of first antenna signals included a representation of the Zadoff-Chu sequence; wherein an executing by the processor of the first processor set of operations related to a certain Zadoff-Chu sequence occurs during an executing by the hardware accelerator of the first hardware accelerator set of operations relating to another Zadoff-Chu sequence;

wherein the at least first sub-set of the set of Zadoff-Chu sequences does not include at least one first residual Zadoff-Chu sequence of the set of Zadoff-Chu sequences; and wherein the non-transitory computer readable medium stores instructions that once executed by the processor causes the processor to execute the stages of: solely searching for the presence of each first residual Zadoff-Chu sequence in the set of first antenna signals; and executing a search of one or more residual Zadoff-Chu sequences in a non-continuous manner and during time windows resulting from time differences between a duration of an execution of the hardware accelerator set of operations and a duration of the processor set of operations.

13. The non-transitory computer readable medium according to claim 12, wherein the second sub-set of Zadoff-Chu sequences does not include at least one second residual Zadoff-Chu sequences and wherein the non-transitory computer readable medium stores instructions that once executed by an additional processor of the computerized system causes the additional processor to execute the stages of solely searching for the presence of each second residual Zadoff-Chu sequence in the set of the first antenna signals.

14. The non-transitory computer readable medium according to claim 12 that stores instructions that once executed by the processor and the hardware accelerator causes the processor and the hardware accelerator to execute the steps of fetching information required for partially searching for two or more Zadoff-Chu sequences at a time and to partially searching for the two or more Zadoff-Chu sequences before fetching information required for searching other two or more Zadoff-Chu sequences.

15. The non-transitory computer readable medium according to claim 12 that stores instructions that once executed by the processor and the hardware accelerator causes the processor and the hardware accelerator to execute the steps of:
  receiving a set of second antenna signals that represent input signals received by the second antenna;
  performing by the hardware accelerator, for each Zadoff-Chu sequence of at least the first sub-set of the set of Zadoff-Chu sequences, a second hardware accelerator set of operations that comprises performing a frequency domain to time domain transformation of a fifth intermediate vector to provide a sixth intermediate vector that is associated with the Zadoff-Chu sequence;
  performing by the processor, for each Zadoff-Chu sequence of at least the second sub-set of Zadoff-Chu sequences a second processor set of operations that comprises: calculating a second intermediate vector in response to the third intermediate vector and the sixth intermediate vector; and performing a search, based on the second intermediate vector, to determine whether the set of first antenna signals included a representation of the Zadoff-Chu sequence; and
  wherein an execution of a second processor set of operations related to a certain Zadoff-Chu sequence is performed during an execution of a second hardware accelerator set of operations relating to another Zadoff-Chu sequence.

\* \* \* \* \*